United States Patent
Greubel et al.

[11] 3,821,720
[45] June 28, 1974

[54] STORAGE DEVICE USING CHOLESTERIC/NEMATIC LIQUID CRYSTALS

[75] Inventors: Waldemar Greubel; Hans Krueger; Ulrich Wolff, all of Munich, Germany

[73] Assignee: Siemens Aktiengesellschaft, Berlin and Munich, Germany

[22] Filed: May 9, 1973

[21] Appl. No.: 358,709

[30] Foreign Application Priority Data
May 10, 1972  Germany.......................... 2222974

[52] U.S. Cl............... 340/173 LS, 340/173 LT, 350/160 LC, 250/213 R, 324/96
[51] Int. Cl...................... G11c 13/00, G11c 13/04
[58] Field of Search........... 340/173 CC, 173 LT, 173 LM, 340/173 LS; 350/160 LC

[56] References Cited
UNITED STATES PATENTS
3,627,408  12/1971  Fergason................................ 353/84
3,775,757  11/1973  Taylor............................ 340/173 LS

*Primary Examiner*—Terrell W. Fears
*Attorney, Agent, or Firm*—Hill, Gross, Simpson, Van Santen, Steadman, Chiara, & Simpson

[57] ABSTRACT

An improved image storage device of the type utilizing a liquid crystal composition comprising material having nematic liquid crystallinity and material having cholesteric liquid crystallinity is provided together with an improved method of temporary image storage and erasure. The liquid crystal composition has positive dielectric constant anisotropy and shorter extinction times compared to prior art.

12 Claims, 6 Drawing Figures

STORAGE DEVICE USING CHOLESTERIC/NEMATIC LIQUID CRYSTALS

BACKGROUND OF THE INVENTION

Image storage screens of the type employing mixtures of cholesteric and nematic liquid crystals were reported by Heilmeier and Goldmacher and described in the article "A New Electric Field Controlled Reflective Optical Storage Effect in Mixed Liquid Crystal Systems," in the magazine Proc. of the IEEE, Vol. 57, No. 1, 1969, in accordance with which a cholesteric/nematic liquid crystal mixture is employed between a transparent electrode and a reflective electrode. Initially the liquid crystal mixture is transparent in the field-free state and develops a light-scattering effect on the application of an electric dc or ac field applied across the electrodes. After removal of the electric field, the light-scattering state of the mixture is retained for many hours. However, upon a subsequent application of an ac voltage with a frequency of more than approximately 700 Hz, this light-scattering state is transformed back into the transparent state. At a field strength below the danger of electric breakdowns, the minimum extinction time for such a screen amounts to 0.5 seconds.

This relatively high extinction time is believed to be associated with the fact that the cholesteric/nematic liquid crystal mixtures used by Heilmeier and Goldmacher display a relatively weakly negative dielectric constant anisotropy, i.e., the dielectric constant parallel to the longitudinal axis of the liquid crystal molecule is lower than that perpendicular thereto. Cholesteric/nematic liquid crystal mixtures possess a cholesteric structure. A thin liquid crystal layer between two level bearing plates or electrodes in the field free state possesses a transparent planar texture which, when a dc voltage or a low frequency ac voltage is applied to the layer, is transformed into a light-scattering focal-conical texture. On the application of ac voltages possessing frequencies above 700 Hz, the planar texture may be reestablished by dielectric orientating forces only in the presence of negative dielectric constant anisotropies. The planar texture is formed all the more rapidly by the higher frequency ac field the greater the negative dielectric constant anisotropy of the substance employed. However, fundamentally it is difficult, if not impossible, to produce liquid crystals with a high negative dielectric constant anisotropy.

Extinction times of more than 0.5 seconds are, however, disadvantageous for many applications, in particular for matrix-shaped image storage screens, in which rapid, selective extinction is a decisive criterion.

BRIEF SUMMARY OF THE INVENTION

The present invention is believed to overcome the objectionably long minimum extinction times associated with prior art cholesteric/nematic liquid crystal storage screens and relates to an improved apparatus and method utilizing cholesteric/nematic liquid crystal layers having a positive dielectric constant anisotropy.

The invention has for a primary object the provision of such storage screens with shorter extinction times than heretofore known.

Another object is to provide an image storage device using cholesteric/nematic liquid crystals which incorporates means for pre-orienting portions of such crystals in regions adjacent the electrode surfaces used in such device.

Other and further objects will become apparent to those skilled in the art from a reading of the present specification, drawings and claims.

DETAILED DESCRIPTION

Figure 1:
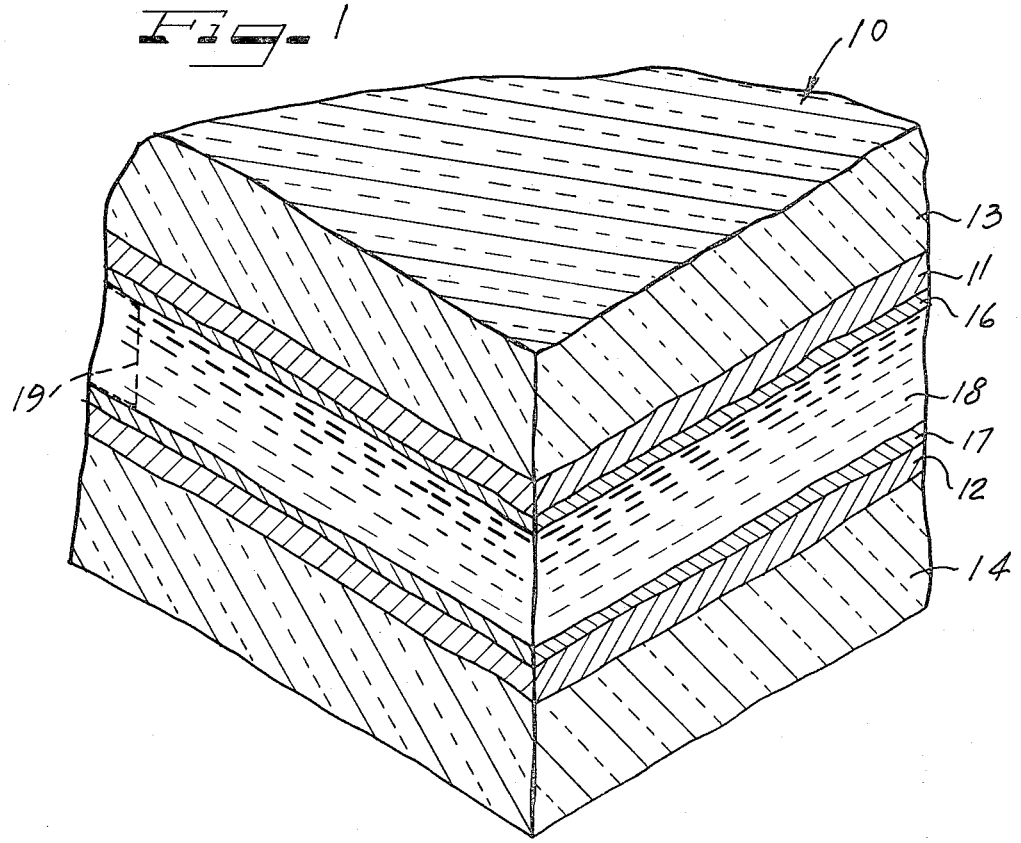
FIG. 1 is a schematic, fragmentary, prospective, vertical sectional view of a segment of a preferred image storage screen of the present invention showing the individual layers utilized in this device.

Referring to FIG. 1, there is seen illustrated a portion of an embodiment of an image storage device of this invention, the device herein being designated in its entirety by the numeral 10. Device 10 is seen to employ a pair of electrodes 11 and 12. Each electrode 11 and 12 is a vacuum vapor deposited substantially transparent film of conductive material and such film is deposited on glass plates 13 and 14 respectively. Those skilled in the art will recognize that the combination of electrode 11 with glass plate 13, and of electrode 12 with glass plate 13 is known as conductive glass. Conductive glass is formed of plate glass having a thin coating of stannic oxide produced by spraying glass at about 900° to 1,300° F with a solution of stannic chloride to produce a coating thickness of about 50 to 550 millimicrons. The resulting stannic oxide layer will carry current densities of about 600 watts per square inch indefinitely. The coatings are hard and resistant to solvents. The light transmission is about 70 to 88% that of the original glass and the index of refraction is about 2.0 compared with 1.53 for glass. Examples of commercially available conductive glass include those available under trademarks such as "Electrapane" of the Libby Owens Ford Glass Company, and "Nesa" of the Pittsburgh Plate Glass Company. Any convenient conductive glass or transparent electrode member may be employed in this invention as those skilled in the art will appreciate.

Each conductor layer 11 and 12 is coated with a layer 16 and 17, respectively, of a surface active material. Positioned between layers 16 and 17 is a layer 18 of a mixture composition of cholesteric and nematic liquid crystals. The layers 16 and 17 are thin so as not to interfere substantially with the passage of an electric current therethrough, and the layers 16 and 17 are each adapted to align the longitudinal axes of the respective individual nematic crystals adjacent said layer in layer 18 in a direction substantially normal to the faces of conductors 11 and 12 when the mixture composition comprising layer 18 has a transparent planar structure relative to the face of either transparent electrode 11 and 12. A preferred surface acting material for use in layers 16 or 17 is lecithin although as those skilled in the art will appreciate, any of a wide variety of surface materials may be used in such layer.

Spacer means such as 19 (typically a thin strip of an inert, insulation polymeric material such as polytetrafluoroethylene film, or the like) maintain the spacing between electrodes 11 and 12 and serve to define a chamber for containing and defining the liquid layer 18. Electrode leads (not shown) permit electrical interconnection of each electrode 11 and 12 with appropriate sources (not shown) of electricity for operating device 10.

Figure 2:
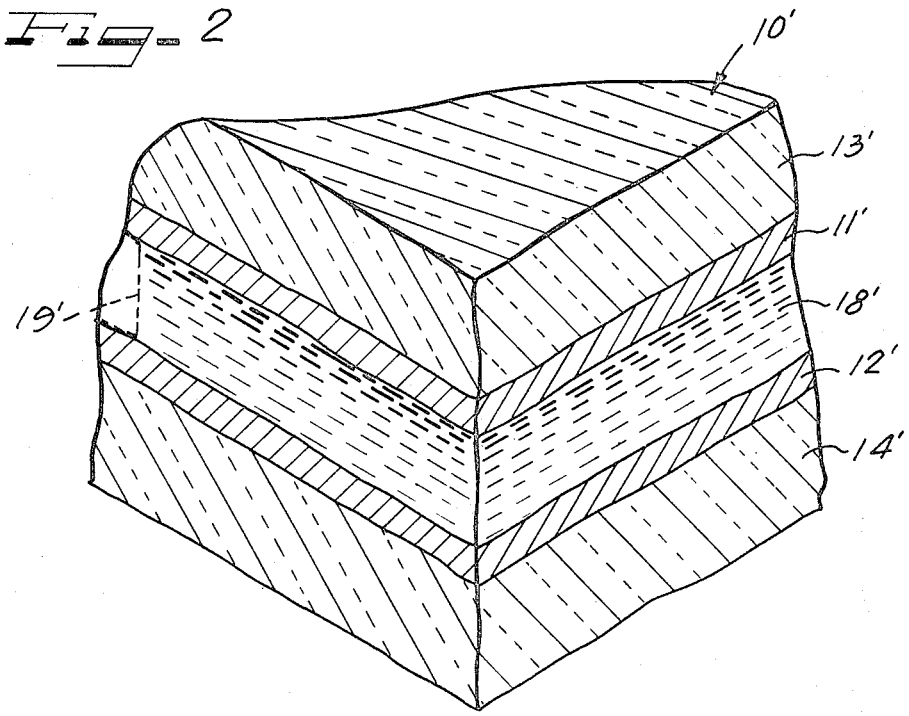
FIG. 2 is a view similar to FIG. 1, but showing another embodiment having no surface active layers thereon.

In FIG. 2, is seen another embodiment of a device of the invention which is similar to that of FIG. 1, but here is numbered 10'. Similar elements of device 10' are similarly numbered to elements in device 10 but with the addition of prime marks thereto. As can be seen, device 10' employs no surface active material layers.

While any convenient and conventional transparent electrode may be used in this invention, it will be appreciated that both electrodes 11 and 12 (or 11' and 12') may be transparent, but one of these electrodes may be specularly reflecting electrodes which then serves as a back electrode in a device of this invention. A device using such reflecting electrode preferably faces into a black background to maximize contrast between image and background (during use of such a device) and to direct the forward scattered photo radiation back through the liquid crystal layers to the viewer.

In such a device as 10 with layers 16 and 17, the longitudinal axes of the liquid crystal molecules present in a liquid crystalline layer 18 adjacent to layers 16 and 17 are aligned in a direction normal to the faces of the bearing plates. A layer 16 or 17 is preferably as thin as practical and more preferable is about monomolecular in thickness. On the application of an extinction voltage pulse, a nematically homeotropic texture arises in the crystalline layer 18 in an optimally uniform fashion. This again promotes the formation of a uniform planar cholesteric texture. Furthermore, with this border orientation, the texture transition from focal-conical to nematically homeotropic takes place at lower field strengths.

It is preferred that a liquid crystal mixture possess a specific resistance of not greater than about $10^{11}$-cm., which is generally achievable when the liquid crystalline substances used possess a high degree of purity. Both ac and dc voltages may be employed as an extinction voltage.

The thickness of a layer 18 or 18' ranges from 6 to 12 microns in this invention.

Figure 4:
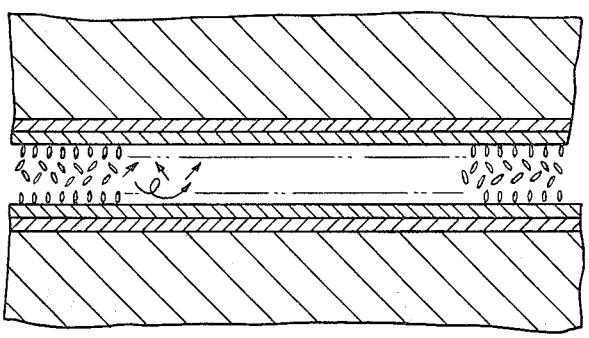
FIG. 4 is a view similar to FIG. 3 with the liquid crystal molecules in a focal-conical configuration.
Figure 5:
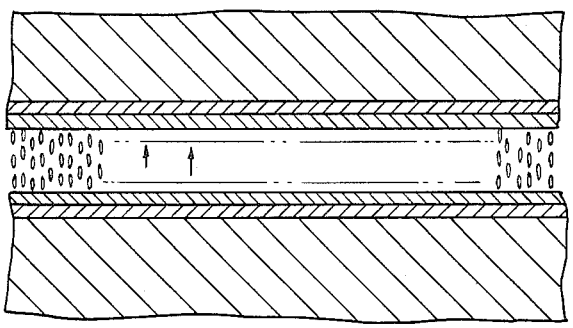
FIG. 5 is a view similar to FIG. 3 with the liquid crystal molecules in a nematic-homeotropic configuration.

A liquid crystal composition of this invention substantially filling the space between electrodes comprises on a 100 weight percent total composition basis a mixture of from about 51 to 99 weight percent material having nematic liquid crystallinity and, correspondingly from about 1 to 49 weight percent material having cholesteric liquid crystallinity such composition in said chamber displays a positive dielectric constant anisotropy such that 1. $20 \geq [\Sigma_\parallel - \Sigma_\perp]\ 0.2$ where $\Sigma_\parallel$ is the dielectric constant in a direction parallel to the longitudinal axis of the molecules of the liquid composition in a storage device of this invention (measured in the nematic homeotropic texture as shown in FIG. 5).

and $\Sigma_\perp$ is the dielectric constant in a direction perpendicular to the helical axis of the liquid composition in a storage device of this invention (measured in the focalconic texture as shown in FIG. 4).

The cholesteric material used in said composition has a helical pitch of from about 2 to 5 times smaller than the spacing between electrodes.

Suitable cholesteric materials and nematic materials are generally well known and usually are organic in composition, as those skilled in the art appreciate.

One presently proposed liquid mixture system comprises from about 90 to 95 weight percent nematic p-emthoxy-p'-n-butylazoxybenzene with the balance up to 100 weight percent thereof being cholesterylchloride.

In a storage device of this invention which displays positive dielectric constant anisotropy as indicated above, after a direct current or an alternating current voltage is applied across electrodes such as 11 and 12 in device 10, the liquid crystal layer 18 possesses a light-scattering, focal-conical milky texture with a layer-wise helix formation and a screw axis parallel to the faces of the electrodes 11 and 12. The light-scattering liquid crystal layer becomes transparent again if a short voltage pulse transforms the focal-conical texture into a transparent, nemtically homoetropic texture, wherein all the molecule longitudinal axes are aligned in a direction normal to the surfaces of the bearing plates. After the extinction voltage pulse has died out, the likewise transparent, planar texture is spontaneously formed, when the molecule longitudinal axes run parallel to the faces of the carrier plates and a helical cholesteric crystalline structure is formed. The extinction voltage must only be applied until the nematically homeotropic texture has formed. The greater the positive dielectric constant anisotropy and the greater the extinction voltage, the more rapidly the texture transition from focal-conical to nematically homeotropic takes place.

Both long storage times and short extinction times may be achieved in a device of this invention using the indicated helix pitch and indicated layer thickness for a cholesteric/nematic composition.

When practicing the process of this invention, one first selectively applies across opposed, parallel faces of a layer of a composition, a voltage in a pattern representation of information to be stored, 1. said layer ranging from about 6 to 12 millimicrons in thickness,
2. said composition being as defined above, and
3. said voltage being either a direct current or an alternating current. such composition at the time of such applying has a transparent, planar texture and such voltage used in such applying is applied for a time sufficient to generate in said layer a light-scattering, focal-conical, milky texture with a layer-wise helical nematic crystalline formation therein having a screw axis substantially parallel to said forces and in a pattern representative of said information to be stored. In this way, desired information is recorded in an image-wise pattern in such layer.

To electronically erase such image, one applies across said faces a dc or ac extinction voltage pulse for a total time of less than about 30 microseconds to 30 milliseconds, but which time with this interval is sufficient to transform the texture of said layer into a transparent, nematically homeotropic form wherein the nematic-cholesteric crystals are aligned in a direction substantially normal to said faces.

Figure 3:
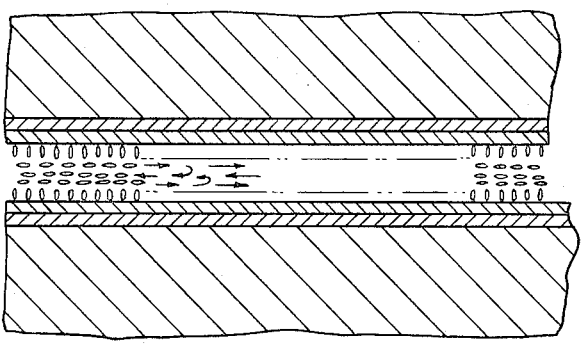
FIG. 3 is a diagrammatic representation of a storage device of this invention with the liquid crystal materials in a quiescent condition.

Each of FIGS. 3 through 6, shows, diagrammatically, a storage device of the present invention in a different configuration. Each view is taken cross-sectionally through a storage device of this invention. In the central portion is a liquid crystal composition. A lecithin layer is adjacent such composition on either face thereof. Behind the lecithin layer is an electrically conductive layer, and behind the electrically conductive layer is a backing layer. In FIG. 3, the liquid crystal mixture molecules directly contacting each lecithin layer are vertical, while the molecules in the central region of such liquid crystal mixture are parallel to the lecithin layer and to the backing layer or carrier plate.

FIG. 4 shows a device after a recording pulse has been applied across the electrode layers, for example, a pulse of 15 volts applied for about 100 microseconds, which leaves the liquid crystal mixture in a light-scattering condition. The drawing does not illustrate the helical axis in this focal-conical mixture.

In FIG. 5 is seen the appearance of the liquid crystal mixture of FIG. 4 after the application of an erasure pulse thereto which leaves the nematic-homeotropic molecules in a transparent orientation which is perpendicular to the carrier plates. A suitable erasure pulse here would be, for example, about 30 volts applied for about 100 microseconds.

Figure 6:
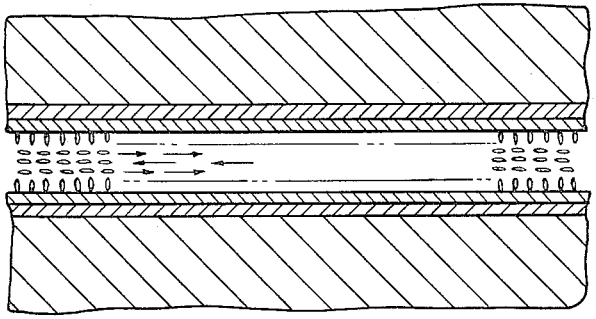
FIG. 6 is a view similar to FIG. 3 with the liquid crystal molecules in a nematic-homeotropic configuration, at a time subsequent to the configuration of FIG. 5.

In FIG. 6 is shown the appearance of the device of FIG. 5 after the same has undergone a spontaneous transition from the configuration shown in FIG. 5 to a planar configuration, as similar to the nematic-homeotropic configuration of FIG. 3.

A large positive dielectric constant anisotropy of a composition of a device of this invention is advantageous in that a low field strength is normally then sufficient for the erasing and the erasing time is also typically shortened. Cholesteric-nematic liquid crystal compositions with a large dielectric constant anisotropy can be found while choosing cholesteric and nematic liquid crystal materials which have large dipole moments and therefore, large dielectric constants parallel to their molecule longitudinal axes.

The dielectric constants $\Sigma_{\Pi}$ and $\Sigma_{\perp}$ of cholesteric-nematic liquid crystal compositions can be measured exactly according to a nematic-homeotropic or focal-conical, respectively, adjustment of the liquid crystals in a magnet field in a capacity gauging bridge.

A mathematical determination of the positive dielectric constant anisotropy cannot yet be realized.

Lecithin layers are not absolutely necessary in a device of the present invention, but they have the advantage of increasing the transparency of the liquid crystal layer subsequently to the application of an erasing pulse.

The magnitude of the erasing pulse, by means of which an electrical field is applied to the liquid crystal layer, has to be such that the electrical field exceeds the critical field strength $E_{kr}$ for the change of the focal-conical to the nematic texture. This magnitude can be determined from the relation $$E_{kr} = \pi 2/p \sqrt{(4\pi \cdot k/\Sigma_{\Pi} - \Sigma_{\perp})}.$$

whereby, $p$ is the pitch of the helix structure, $k$ is the twist elastic constant.

PREFERRED EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings. All parts are parts by weight, unless others are indicated.

EXAMPLE 1

An image storage device of this invention is prepared and evaluated as follows:

The liquid crystal composition used consists essentially of 94% by weight nematic p-methoxy-p'-n-butylazoxybenzene and 6% by weight cholesterylchloride. This composition is embedded in a layer of constant thickness of 10 microns between the two electrodes. Glass spacer elements are employed. The positive dielectric constant anisotropy of such layer is 0.2 measured as $[\Sigma_{\Pi} - \Sigma_{\perp}]$ as these terms are defined above in Formula 1. The composition itself has a helical pitch of 2.6 microns. The inner opposed surfaces of the electrodes are each coated with an approximately monomolecular lecithin layer for the purpose of orienting the longitudinal axes of the respective individual liquid crystal molecules adjacent the lecithin layer in the device in a direction normal to the lecithin layer.

Lecithin layers are applied by dipping an electrode surface into an ethanol solution of lecithin and evaporating. The composition in said liquid crystal layer has a specific resistance of about $10^{11}$ Ω-cm.

On the application to the device of a direct current electric voltage of 10 volts and 1 microamp/cm² amperes across the electrodes in an image forming pattern with the composition at the time of said applying having a transparent, planar texture, then is produced a visible pattern in the layer corresponding to the image froming pattern a light-scattering, focal-conical milky texture with a layer-wise helical nematic crystalline formation therein which has a screw axis substantially parallel to the layer faces. When the applied voltage is removed, the light-scattering state of the composition in the layer is retained for many hours.

EXAMPLE 2

With a device as described in Example 1, the recording procedure of Example 1 is repeated except that, after the applied voltage is removed following image formation in the layer, there is applied across the electrodes a voltage pulse of 100 volts and also about 1 microamp/cm² amperes per square centimeter of electrode surface area for a total time of about 30 milliseconds. During such application of voltage, the texture of said layer is transformed into a transparent, nematically homeotropic form wherein the nematic-cholesteric molecules are aligned in a direction substantially normal to said faces.

After such voltage is removed and said extinction voltage pulse has died out, the texture of said layer is transformed into the initial transparent, planar texture present in said composition before application of the image recording signal.

This procedure of recording and erasing may be repeated indefinitely without any observable electrochemical change occurring in said device.

EXAMPLE 3

Using a device as described in Example 1, there is applied an alternating voltage of 10 volts and 50 hertz, and a visible pattern similar to that obtained in Example 1 is produced. This pattern is retained for many hours.

EXAMPLE 4

With a device as described in Example 1, the recording procedure of Example 3 is repeated except that thereafter the procedure for Example 2 is followed to erase the image so formed. Results equivalent to those in Example 2 are observed.

EXAMPLE 5

The procedure of Example 1 is repeated except that the liquid crystal composition used consists essentially of 94 percent by weight of a 1:1:1 nematic liquid crystal composition of $n$ (4'-Butoxybenzylidene) — aminobenzonitrile, $n$ (4'-Hexoxybenzylindene) 4 — aminobenzonitrile, and $n$ (4'-Octanoic acid) 4 — aminobenzonitrile
and 6 percent by weight cholesterylchloride. This composition is embedded in a layer of constant thickness of 10 microns between the two electrodes. The positive dielectric constant anisotropy of such layer is 16 measured as $\Sigma_\Pi - \Sigma_\perp$ as these terms are defined above in Formula 1. After recording an image using a recording pulse or writing pulse of about 15 volts applied for about 100 microseconds, it is found that the so recorded image may be erased using an erasing pulse of 30 volts applied for about 100 microseconds.

EXAMPLE 6

The procedure of Example 1 is repeated except that the liquid crystal composition used consists essentially of 94 percent by weight of a nematic fluid crystal composition of two parts 4 — (4' — n Hexylbenzylideneamino) — benzonitrile
and
one part 4 — (4' n Propylbenzylideneamino) — benzonitrile and 6% by weight cholesterylchloride. This composition is embedded in a layer of constant thickness of 10 microns between the two electrodes. The positive dielectric constant and isotropy of such layer is 14 measured as $\Sigma_\Pi - \Sigma_\perp$, as these terms are defined above in Formula 1. After recording an image using a recording pulse or writing pulse of about 15 volts applied for about 100 microseconds, it is found that the so-recorded image may be erased using an erasing pulse of 30 volts applied for about 100 microseconds.

The claims are:

1. An improved image storage device comprising in combination:
  A. a pair of electrodes in sheet-like form, one of said electrodes being transparent and in spaced, generally parallel relationship to the other thereof, the spacing between said electrodes ranging from about 6 to 12 millimicrons,
  B. spacer means between said electrodes adapted to maintain said electrodes in fixed spatial relationship to each other and further adapted to define a generally fluid tight chamber therebetween,
  C. a liquid crystal composition substantially filling said chamber and comprising on a 100 weight percent total composition basis a mixture of from about 51 to 99 weight percent material having nematic liquid crystallinity and correspondingly from about 1 to 49 weight percent material having cholesteric liquid crystallinity, said composition in said chamber displaying a positive dielectric constant anisotropy such that
  $$20 \geq \Sigma_\Pi - \Sigma_\perp \geq 0.2$$
  where $\Sigma_\Pi$ is the dielectric constant in a direction parallel to the longitudinal axis of the molecules of the liquid composition in a storage device of this invention,
  and $\Sigma_\perp$ is the dielectric constant in a direction perpendicular to the helical axis of the liquid composition in a storage device of this invention, and
  D. said cholesteric material in said composition having a helical crystalline pitch of from about 2 to 5 times smaller than said spacing.

2. The device of claim 1, wherein the opposed faces of said electrodes in said chamber are each coated with a layer of surface-active material adapted to align the longitudinal axes of the respective individual liquid crystals adjacent said layer in a direction substantially normal to said opposed faces.

3. The device of claim 1, wherein each of said electrodes is transparent.

4. The device of claim 1, wherein said other one of said electrodes has a specularly reflecting electrode.

5. The device of claim 1, wherein said composition comprises from about 90 to 95 weight percent nematic P-methoxy-p'-n-butylazoxybenzene with the balance up to 100 weight percent thereof being cholesterylchloride.

6. The device of claim 1, wherein said composition in said layer has a specific resistance of at least about $10^{11}$ $\Omega$-cm.

7. An improved method for temporary image storage comprising the sequential steps of
  A. selectively applying across opposed parallel faces of a layer of a composition a voltage in a pattern representative of information to be stored,
    1. said layer ranging from about 6 to 12 millimicrons in thickness
    2. said composition comprising on a 100 weight percent total composition basis a mixture of from about 51 to 99 weight percent material having nematic liquid crystallinity and correspondingly, from about 1 to 49 weight percent material having cholesteric liquid crystallinity, said composition in said layer displaying a positive dielectric constant anisotropy such that
    $$20 \geq \Sigma_\Pi - \Sigma_\perp \geq 0.2$$
    where $\Sigma_\Pi$ is the dielectric constant in a direction parallel to the longitudinal axis of the molecules of the liquid composition in a storage device of this invention,
    and $\Sigma_\perp$ is the dielectric constant in a direction perpendicular to the helical axis of the liquid composition in a storage device of this invention.
    3. said voltage being either a direct current or an alternating current or both, said composition at the time of said applying having a transparent, planar texture, said voltage being so applied for a time sufficient to generate in said layer a light-scattering, focal-conical, milky texture with a layer-wise helical nematic crystalline formation therein having a screw axis substantially parallel to said faces and in a pattern representative of said information to be stored, and B. applying across said faces a direct current or an alternating current extinction voltage pulse for a time of less than about 30 microseconds to 30 milliseconds, but which time interval is sufficient to transform the texture of said layer into a transparent, nematically homeotropic form wherein the liquid crystal molecules are aligned in a direction substantially normal to said faces.

8. The method of claim 7, wherein said composition comprises from about 90 to 95 weight percent nematic p-methoxy-p'-n-butylazoxybenzene with the balance up to 100 weight percent thereof being cholesterylchloride.

9. The method of claim 7, wherein after said extinction voltage pulse has died out, the texture of said layer is transformed into said transparent, planar texture wherein a helical cholesteric crystalline structure is formed.

10. The method of claim 7, wherein said layer has a specific resistance of at least about $10^{11}$ Ω-cm.

11. The method of claim 7, wherein each of said opposed faces is in contact with a layer of surface active material adapted to align the longitudinal axes of the respective individual molecules adjacent thereto in a direction substantially normal to said opposed faces relative to said faces.

12. The method of claim 11, wherein said surface active layers comprises lecithin.

* * * * *